United States Patent
Sakumoto et al.

(10) Patent No.: US 6,449,583 B1
(45) Date of Patent: Sep. 10, 2002

(54) PORTABLE MEASUREMENT APPARATUS

(75) Inventors: Kazumi Sakumoto; Hiroshi Odagiri; Hideaki Nagatsuma, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/634,242

(22) Filed: Aug. 8, 2000

(30) Foreign Application Priority Data

Aug. 10, 1999 (JP) .............................. 11-226219

(51) Int. Cl.$^7$ ...................... G06F 15/00; G06F 17/18; G06F 101/14
(52) U.S. Cl. ........................... 702/179; 482/8
(58) Field of Search ................. 702/179, 176, 702/177, 178; 368/19, 10, 13; 73/1.43, 488; 482/8

(56) References Cited

U.S. PATENT DOCUMENTS

| | | | | |
|---|---|---|---|---|
| 4,991,156 A | * | 2/1991 | Suga | 368/113 |
| 5,696,706 A | * | 12/1997 | Morton et al. | 702/142 |
| 5,941,837 A | * | 8/1999 | Amano et al. | 600/595 |
| 6,013,007 A | * | 1/2000 | Root et al. | 482/8 |
| 6,122,960 A | * | 9/2000 | Hutchings et al. | 73/493 |

FOREIGN PATENT DOCUMENTS

JP 07-198873 * 8/1995

* cited by examiner

*Primary Examiner*—John S. Hilten
*Assistant Examiner*—Demetrius R. Pretlow
(74) *Attorney, Agent, or Firm*—Adams & Wilks

(57) ABSTRACT

A measurement section for measuring a time and a period of time and outputting the measured data; a storing section for storing the measured data to be outputted from the measurement means and statistical data that is a statistical value or values obtained by sequentially processing and calculating the measured data; and a control section for setting a determination regarding whether or not the measured data to be outputted from the measurement section is stored in the storing section, and controlling the data storing operation so that the measured data is allowed to be stored in the storing section only when it has been determined to store the measured data, and calculating new statistical data to update the statistical data by employing the measured data and the statistical data stored in the storing section each time when the measured data is outputted from the measurement section.

30 Claims, 18 Drawing Sheets

MEASURED DATA REGION

| REGISTER NAME | DATE | SPLIT TIME | | | SPLIT NUMBER |
|---|---|---|---|---|---|
| RR1 | 1998.12-13 | 00:05'27"51 | | | Split1 |
| RR2 | | 00:10'36"87 | | | Split2 |
| . | | . | | | . |
| . | | . | | | . |
| . | | . | | | . |
| RR30 | | 02:48'52"26 | | | Split30 |

FIG. 8

STATISTICAL DATA REGION

| REGISTER NAME | DATE | TOTAL TIME | MAX | MIN | DAY NUMBER |
|---|---|---|---|---|---|
| OR1 | 1998.12-13 | 04:03'11"87 | 00:08'25"38 | 00:05'19"21 | Day1 |
| OR2 | 1998.12-7 | 01:32'52"62 | 00:09'27"32 | 00:05'02"41 | Day2 |
| OR3 | 1998.12-6 | 02:21'01"25 | 00:08'55"23 | 00:05'04"22 | Day3 |
| . | . | . | . | . | . |
| . | . | . | . | . | . |
| . | . | . | . | . | . |
| OR6 | 1998.12-1 | 02:30'51"88 | 00:09'21"56 | 00:05'11"18 | Day6 |
| . | . | . | . | . | . |
| . | . | . | . | . | . |

FIG. 9

DISPLAY OF MEASURED DATA

FIG. 10A

```
TOTAL          2 : 48'52"26

(30) LAP       '98  12-13
```

LAP 1

```
LAP            0 : 05'27"51

SPLIT          0 : 05'27"51

LAP 2

```
LAP            0 : 05'04"74

SPLIT          0 : 10'32"25

STATISTICS FOR DECEMBER

TOTAL           1 2 0 : 5 1 ' 0 2 " 5 6

(    6) DAYS' 9 8 − 1 2

DISPLAY OF STATISTICAL DATA ON DECEMBER 13

MAX             0 0 : 0 8 ' 2 5 " 3 8
MIN             0 0 : 0 5 ' 1 9 " 2 1
TOTAL           0 4 : 0 3 ' 1 1 " 8 7

(    1)     SUN      1 2 − 1 3

FIG. 11B

DISPLAY OF STATISTICAL DATA ON DECEMBER 7

MAX             0 0 : 0 9 ' 2 7 " 3 2
MIN             0 0 : 0 5 ' 0 2 " 4 1
TOTAL           0 1 : 3 2 ' 5 2 " 6 2

(    2)     MON      1 2 − 7

MEASURED DATA REGION

| REGISTER NAME | DATE | SPLIT TIME | COVERED DISTANCE | SPEED | SPLIT NUMBER |
|---|---|---|---|---|---|
| RR101 | 1998.12-13 | 00:05'27"51 | 1.02km | 11.2km/h | Split1 |
| RR102 | | 00:10'36"87 | 2.06km | 12.1km/h | Split2 |
| . | | . | . | . | . |
| . | | . | . | . | . |
| . | | . | . | . | . |
| RR130 | | 01:08'52"26 | 12.19km | 10.8km | Split30 |

STATISTICAL DATA REGION

| REGISTER NAME | DATE | TOTAL TIME | TOTAL COVERED DISTANCE | DAY NUMBER |
|---|---|---|---|---|
| OR101 | 1998.12-13 | 2:03'02"10 | 25.4km | Day1 |
| OR102 | 1998.12-12 | 2:20'10"88 | 25.8km | Day2 |
| OR103 | 1998.12-11 | 2:21'01"25 | 26.1km | Day3 |
| . | . | . | . | . |
| . | . | . | . | . |
| . | . | . | . | . |
| OR113 | 1998.12-1 | 2:30'51"88 | 32.4km | Day13 |
| . | . | . | . | . |
| . | . | . | . | . |

FIG. 13

PORTABLE MEASUREMENT APPARATUS

BACKGROUND OF THE INVENTION

1. Field of the Invention

The present invention relates to a portable measurement apparatus having a function of calculating a statistical value from measured data of several batches, and more particularly, to a portable measurement apparatus capable of reducing burden to be imposed on a user.

2. Description of the Related Art

The conventional techniques in the art include, for example, the "stopwatch apparatus" as disclosed in Japanese Examined Patent Publication No. Hei H07-97142 B. This kind of stopwatch apparatus can store performance data measured by stopwatch functions in several batches in a storing region for measured data, and further, can calculate statistical values (statistical data), e.g., a total measurement time, an average time, the best lap, the worst lap or the like from the stored measured data of several batches. A user can confirm the stored measured data or performance data or the calculated statistical data by conducting a certain operation, for example, by pushing a certain button.

In general, a portable measurement apparatus such as the conventional stopwatch apparatus as described above has to meet a strict limitation on an amount of measured data that can be stored therein, in view of limitations on size and/or cost.

In the practical situation, it is sometimes desired, for example, for a user as a runner to see such data as an average running time over a period of one year of a runner, or measured data in detail at a certain athletic meet. The above-mentioned conventional stopwatch apparatus cannot meet such a request in which a user wants to confirm these kinds of statistical data to be calculated based on the measured data of several batches, or several measured data in detail. This is because the conventional apparatus cannot store all of the measured data of several batches since it has to meet a strict limitation on an amount of measured data that can be stored therein.

In this case, a user typically behaves as follows. The record of the measured data is started onto a storing region for measured data in the above-mentioned conventional stopwatch apparatus, as usual. When the storing region becomes full, the measured data that have been stored in the storing region are copied by hand onto, e.g., a notebook or the like, and erase the copied measured data from the storing region. Thereafter, the recording of data onto the storing region is resumed. When the storing region becomes full again, the same procedures of copying the measured data that have been stored in the storing region onto a notebook or the like and erasing the copied measured data from the storing region are repeated. Finally, necessary statistical data are calculated from the measured data that were copied onto the notebook or the like.

However, according to the above-mentioned conventional art, when a user wants to confirm any statistical data to be calculated based on the measured data of several batches, or see several measured data in more detail, a user has to repeat the procedures of copying the measured data and erasing the stored measured data in order to calculate the required statistical data. There is a problem in that this is tiresome, and the user has to endure increased burden. In addition, errors are likely to occur when copying the measured data and/or when inputting necessary data for calculation, thereby there was a problem of deteriorating the reliability of the measured data and/or the statistical data. Furthermore, there was a problem in that the measured data or the statistical data cannot be confirmed immediately when required to do so.

SUMMARY OF THE INVENTION

The present invention has been made in view of the above, and therefore has an object thereof to reduce burden imposed on a user, and to allow a user to immediately confirm measured data and statistical data with the high reliability immediately when required to do so, even when an available storage capacity is limited.

In order to achieve the above-mentioned object of the invention, there is provided a portable measurement apparatus comprising: measurement means for measuring at least one of a time, a period of time, a pulse rate, a blood pressure, an atmospheric pressure, a temperature, an intensity of magnetic field, a speed, and a distance, and outputting the measured data; and measured data storing means for storing the measured data to be outputted from the measurement means, there are further provided: setting means for setting a determination regarding whether or not the measured data to be outputted from the measurement means is stored in the measured data storing means; and measured data storing control means for controlling the data storing operation so that the measured data to be outputted from the measurement means is stored in the measured data storing means only when it has been determined in the setting means to store the measured data.

Furthermore, in this portable measurement apparatus, in order to enable to confirm the statistical data to be calculated from the measured data of several batches, there are provided: statistical data storing means for storing statistical data that is a statistical value obtained by sequentially processing and calculating the measured data to be outputted from the measurement means; and, update means for calculating new statistical data by employing the measured data and the statistical data stored in the statistical data storing means each time the measured data is outputted from the measurement means, and updating the statistical data in the statistical data storing means by employing the calculated new statistical data. In this portable measurement apparatus, at least one of a time, a period of time, a pulse rate, a blood pressure, an atmospheric pressure, a temperature, an intensity of magnetic field, a speed, and a distance is measured, and new statistical data is calculated by employing the measured data and the stored statistical data to update the statistical data by employing the calculated new statistical data. Furthermore, it is set whether the measured data is stored or not, and the measured data is stored only when it is determined that the measured data should be stored.

Furthermore, in order to confirm temporal changes in the statistical data over the predetermined times or predetermined periods of time, the statistical data may include a plurality of statistical values for the respective predetermined times or for the respective predetermined periods of time, and the update means may update the corresponding statistical data based on the time or the period of time when the measured data has been measured. In this portable measurement apparatus, the statistical data includes a plurality of statistical values for the respective predetermined times or for the respective predetermined periods of time, and based on the time or the period of time when the measured data has been obtained, the corresponding statistical data is updated.

Furthermore, time period setting means may be provided for arbitrarily setting a time or a period of time for obtaining the statistical data.

In addition, a plurality of calculation schemes may be allowed to be set for calculating the statistical data, and the update means may calculate a plurality of kinds of the statistical data by employing the thus-set plurality of calculation schemes to update the plurality of the statistical data in the statistical data storing means.

In this portable measurement apparatus, a plurality of calculation schemes are allowed to be set for calculating the statistical data, and a plurality of kinds of the statistical data are calculated by employing the thus-set plurality of calculation schemes so as to update the plurality of the statistical data in the statistical data storing means.

BRIEF DESCRIPTION OF THE DRAWINGS

In the accompanying drawings:

FIG. 8 is a diagram for illustrating an example of the contents of a storing region for measured data in accordance with the first embodiment of the present invention;

FIG. 9 is a diagram for illustrating an example of the contents of a storing region for statistical data in accordance with the first embodiment of the present invention;

FIG. 10 is a diagram for illustrating an exemplary display of the measured data in accordance with the first embodiment of the present invention;

FIG. 11 is a diagram for illustrating an exemplary display of the statistical data in accordance with the first embodiment of the present invention;

FIG. 12 is a diagram for illustrating an example of the contents of a storing region for measured data in accordance with a second embodiment of the present invention;

FIG. 13 is a diagram for illustrating the contents of a storing region for statistical data in accordance with the second embodiment of the present invention;

DETAILED DESCRIPTION OF THE PREFERRED EMBODIMENTS

Embodiments of the present invention will now be described below with the reference to the accompanying drawings. Specifically, a first embodiment is first described, which is followed by a second embodiment.

Embodiment 1

Figure 1:
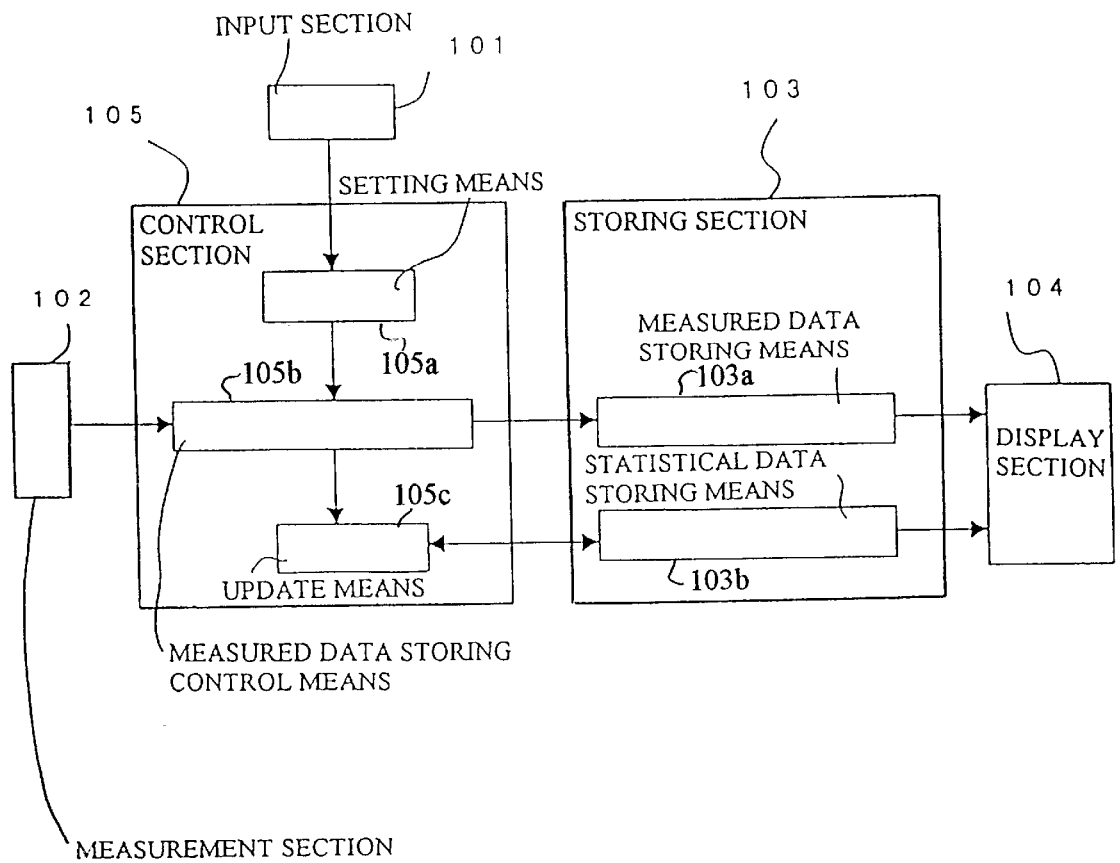
FIG. 1 is a block diagram for illustrating the structure of a wristwatch in accordance with a first embodiment of the present invention.

As a portable measurement apparatus in accordance with a first embodiment of the present invention, a wristwatch having functions as a stopwatch is taken as an example, and the structure thereof will be described with reference to FIG. 1. FIG. 1 is a block diagram for illustrating the structure of a wristwatch in accordance with the first embodiment of the present invention.

A wristwatch in the present embodiment comprises an input section 101, a measurement section 102 for performing measurement of a time or a period of time, a storing section 103 for storing measured data to be outputted from the measurement section 102 and statistical data that is a statistical value or values obtained by sequentially processing and calculating the measured data, a display section 104 for providing various displays, and a control section 105 for controlling each of these sections. The input section 101 includes a mode button (not illustrated) to be used by a user for performing various mode setting operations, and a start button, a stop button, a lap button, and a reset button (each not illustrated) to be used by a user for inputting a start command, a stop command, a lap command, and a reset command for the stopwatch functions.

A user can set a period of time and a calculation scheme for the statistical data via the input section 101. As a period of time, any desired period may be set, for example, one month, one week or the like. Similarly, as a calculation scheme, any calculation scheme may be set for obtaining statistical data, for example, the number of samples, the sum, the maximum value, the minimum value, the average value, the variation value, or the like. In addition, a plurality of calculation schemes may be set to obtain different statistical data.

The control section 105 includes setting means 105a, measured data storing control means 105b, and update means 105c. The storing section 103 includes measured data storing means 103a and statistical data storing means 103b. The control section 105 instructs the period of time and/or the calculation scheme of statistical data that have been set via the input section 101 to be stored in the storing section 103. It is assumed in the present embodiment that a period of time is set as one day, and the maximum and minimum values of the lap time as well as the sum of the measurement time are set as the statistical data to be obtained.

When a start command is input via the input section 101, a start input signal is input to the setting means 105a of the control section 105, and the measured data storing control means 105b starts input of the measured data from the measurement section 102. After completing the measurement, a determination indicating whether the measured data should be stored or not is input via the input section 101. The measured data is stored in the measured data storing means 103a of the storing section 103 only when it is determined to do so. Furthermore, new statistical data is calculated from the measured data and the statistical data that has been already stored in the statistical data storing means 103b of the storing section 103. Based on a period of time in which the measured data was obtained, the corresponding statistical data are updated by the update means 105c. The updated statistical data is stored in the statistical storing means 103b.

The measurement section 102 corresponds to the measurement means of the present invention, and the storing section 103 corresponds to the measured data storing means and the statistical data storing means of the present invention. Furthermore, the control section 105 corresponds to the setting means, the measured data storing control means, update means and the time period setting means of the present invention.

In the structure as set forth above, operations of the apparatus in accordance with the present embodiment will be described with reference to FIGS. 2–7. In the wristwatch in the present embodiment, the control section 105 starts a measurement process relating to the stopwatch measurement when a signal indicating that the start button (not illustrated) has been pushed is input from the input section 101.

Figure 2:
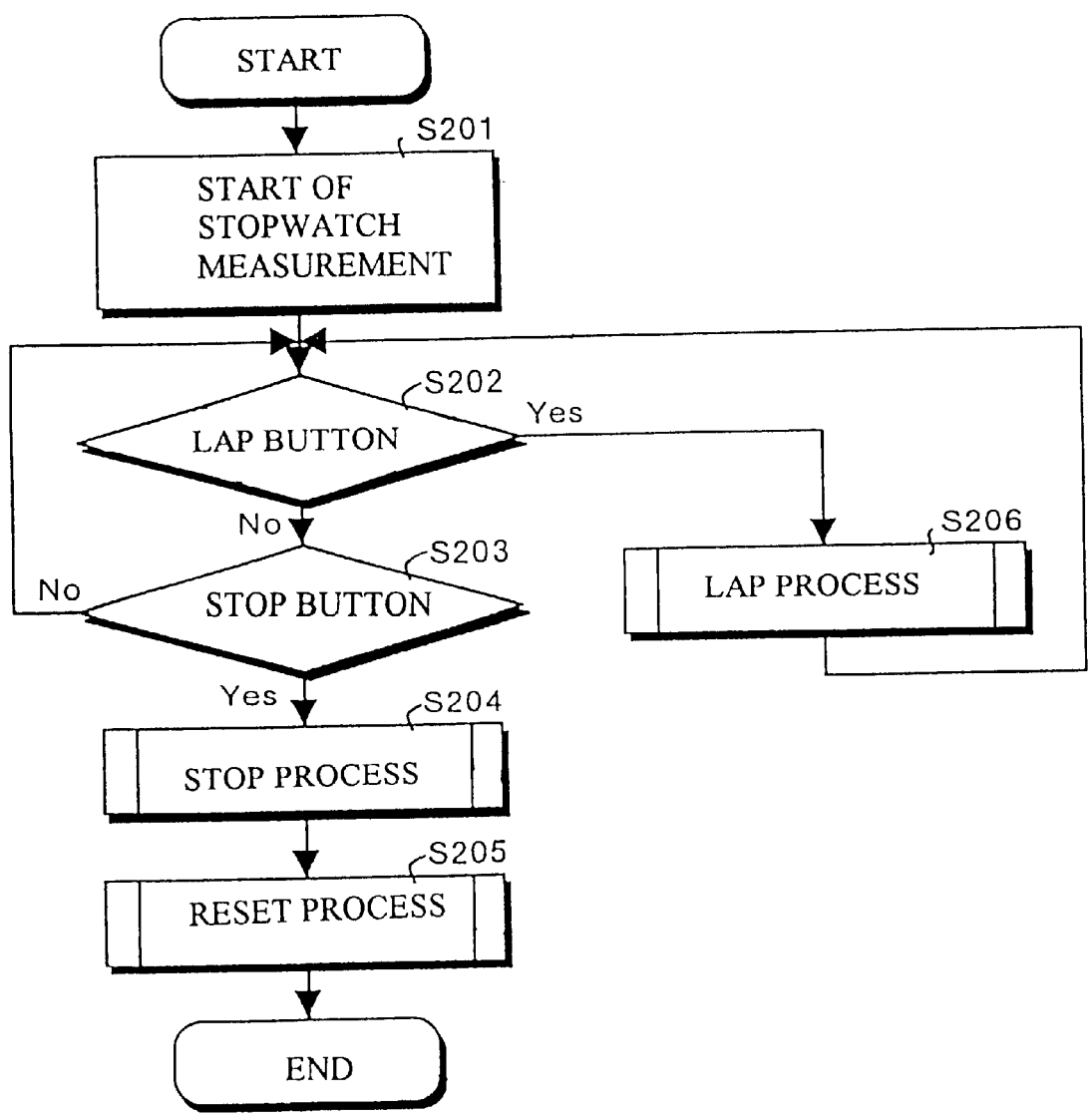
FIG. 2 is a flowchart for illustrating the measurement process to be performed by a control section in accordance with the first embodiment of the present invention.

FIG. 2 is a flowchart for illustrating the measurement process to be performed by the control section 105 in the present embodiment. In the measurement process, the control section 105 first controls the measurement section 102 to start a stopwatch measurement, and to set the number of laps N, which indicates the number of laps stored in the storing section 103, as 1 (S201). Thereafter, the control section 105 waits until a signal indicating that the lap button or the stop button has been pushed is input from the input section 101 (S202, S203).

When the signal indicating that the lap button (not illustrated) has been pushed is input, a lap process is performed for, for example, displaying a lap time (S206). After completing the lap process, a control is returned to the step S202. On the other hand, when the signal indicating that the stop button (not illustrated) has been pushed is input, a stop process for, e.g., performing the completion of the stopwatch measurement, and a reset process for, e.g., performing the storing of the measured data and the statistical data, are performed (S204, S205), and thus the measurement process is completed.

Figure 3:
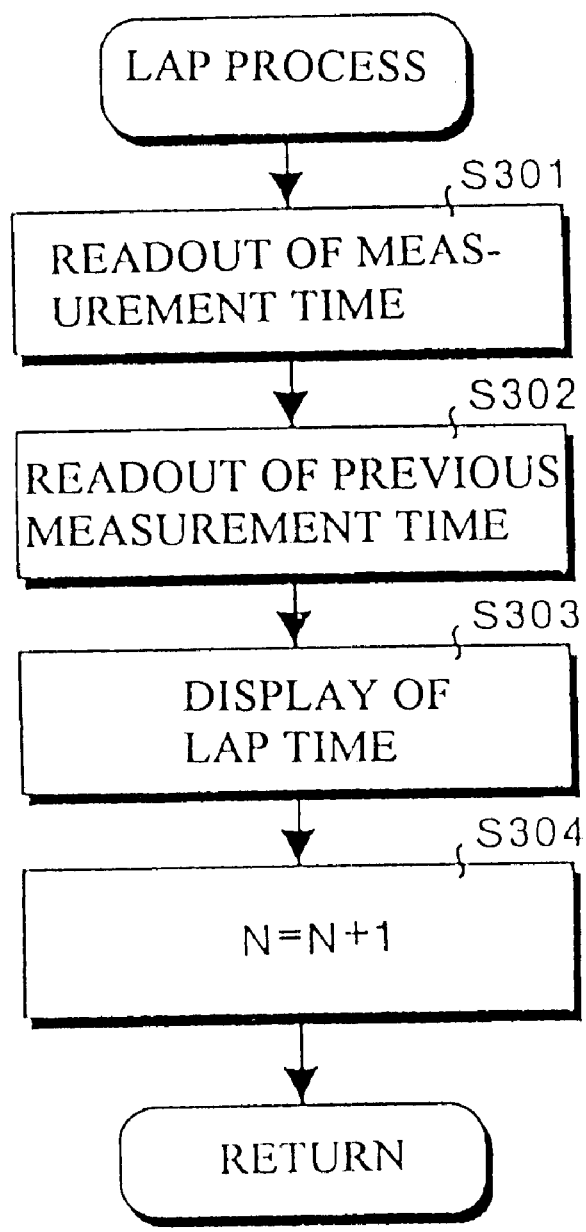
FIG. 3 is a flowchart for the lap process to be performed by the control section in accordance with the first embodiment of the present invention.

FIG. 3 is a flowchart for the lap process to be performed by the control section 105 in the present embodiment. In the lap process, the control section 105 first reads out the measurement time from the measurement section 102. The thus read time is displayed via the display section 104 as a lapse time (split time), and simultaneously stored in a SPLIT(N) register in the storing section 103.

The control section 105 then reads out (S302) the value of the measurement time that was stored in the preceding operation in a SPLIT(N−1) register of the storing section 103 (if N=1, then the value of 0 stored in a SPLIT(0) register is readout). Thereafter, a value of LAP(N) is obtained by subtracting the value in the SPLIT(N−1) register from the value in the SPLIT(N) register and displayed (S303), and the lap number N is incremented (S304). The process is then completed.

Figure 4:
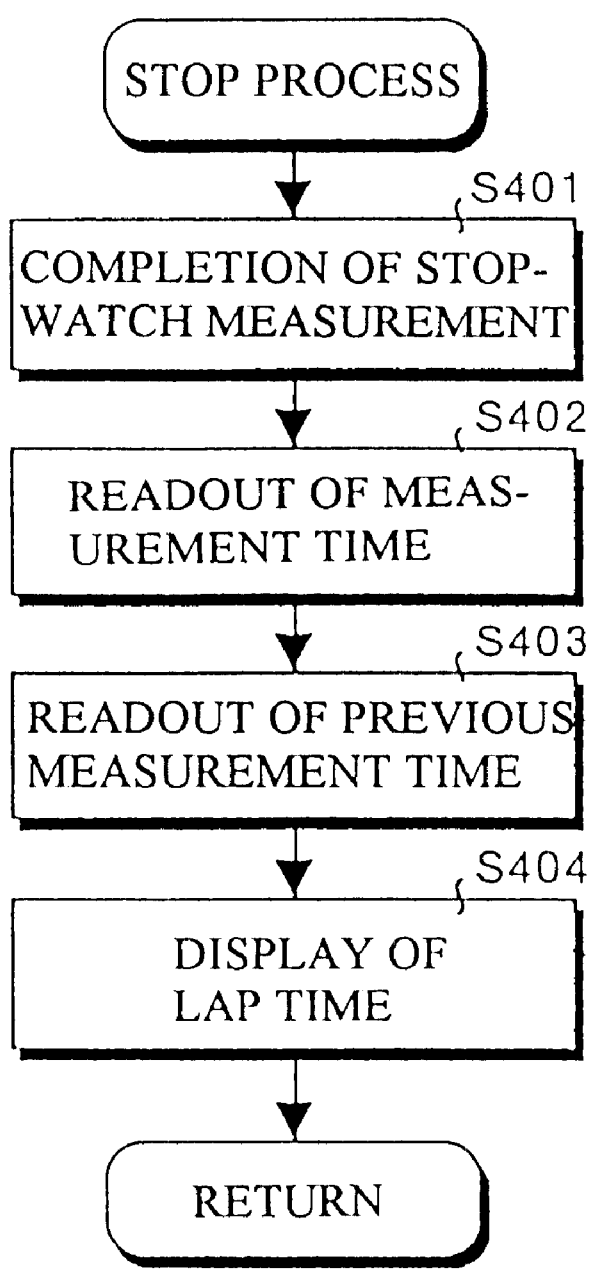
FIG. 4 is a flowchart for the stop process to be performed by the control section in accordance with the first embodiment of the present invention.

FIG. 4 is a flowchart for the stop process to be performed by the control section 105 in the present embodiment. In the stop process, the control section 105 first controls the measurement section 102 to complete the stopwatch measurement (S401). Then, similar to the aforementioned lap process, the control section 105 reads out the measurement time from the measurement section 102. The thus read time is displayed via the display section 104 as a lapse time, and simultaneously stored in a SPLIT(N) register in the storing section 103 (S402).

The control section 105 then reads out (S403) the value of the measurement time that was stored in the preceding operation in a SPLIT(N−1) register of the storing section 103 (if N=1, then the value of 0 stored in a SPLIT(0) register is read out(S 403)). Thereafter, a value of LAP(N) is obtained by subtracting the value in the SPLIT(N−1) register from the value in the SPLIT(N) register and displayed (S404), and the process is then completed.

Figure 5:
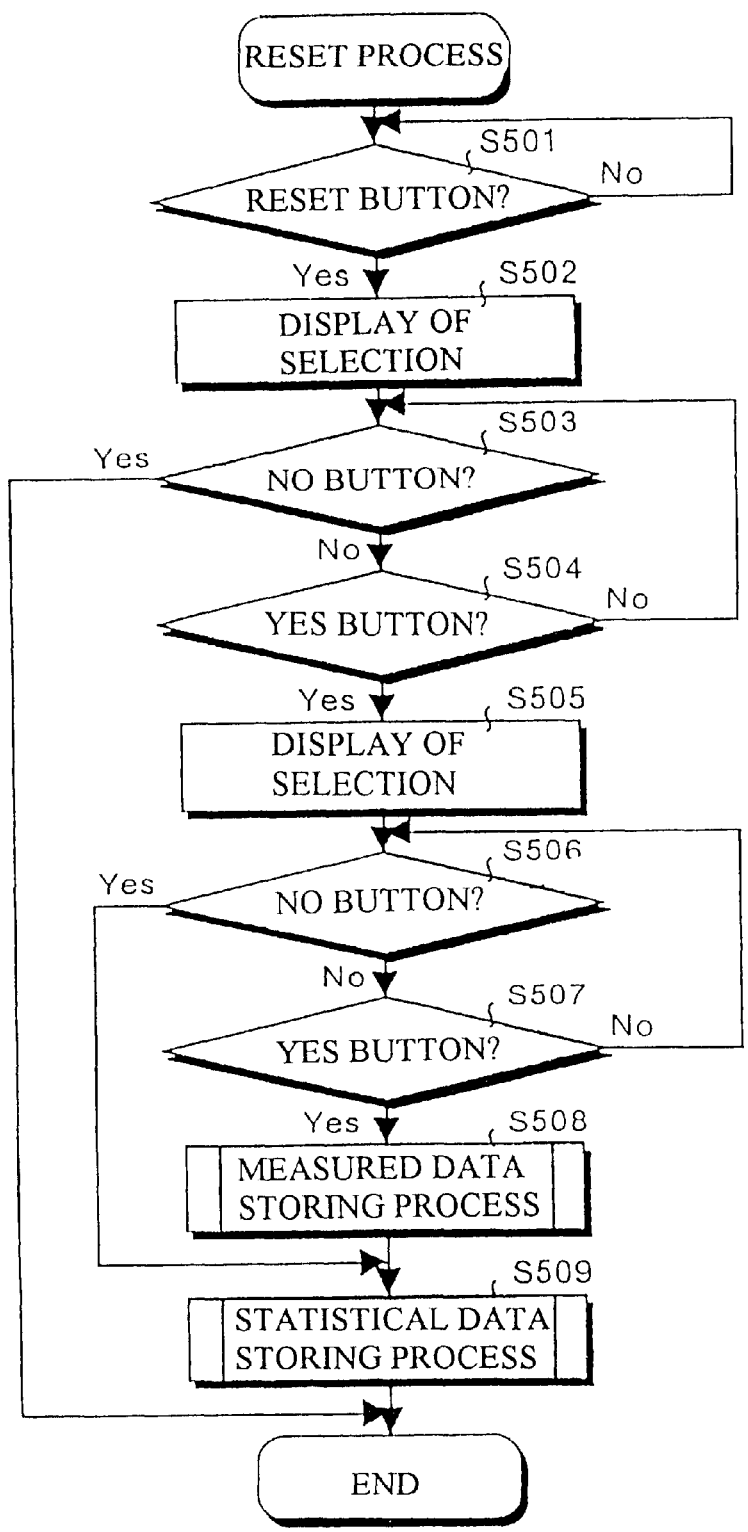
FIG. 5 is a flowchart for the reset process to be performed by the control section in accordance with the first embodiment of the present invention.

FIG. 5 is a flowchart for the reset process to be performed by the control section 105 in the present embodiment. In the reset process, the control section 105 first waits until a signal indicating that the reset button has been pushed is input (S501). When the signal indicating that the reset button has been pushed is input, the control section 105 controls the display section 104 to erase the stopwatch displays such as a lapse time, a lap time or the like, and then provide a display which prompts a user to determine whether the measurement result should be stored or not (S502). A control then waits until a Yes or No button input is provided via the input section 101 (S503, S504).

When the No button input is provided, in other word, when it is determined not to store the measured result, the process is completed. On the other hand, when the Yes button input is provided, in other word, when it is determined to store the measured result, a further display is provided to prompt a user to determine whether the measured data, including the contents of the SPLIT(1) register through the SPLIT(N) register and the date data indicating the date when the measurement was conducted, should be stored as they are, or whether the measured data should be stored in more detail (S505). A control then waits again until a Yes or No button input is provided via the input section 101 (S506, S507).

When the No button input is provided, in other words, when it is determined not to store the measured result in more detail, a control proceeds to step S509. On the other hand, when the Yes button input is provided, in other word, when it is determined to store the measured result in more detail, a measured data storing process is then performed to store the measured data in more detail (S508). After completing the measured data storing process, a statistical data storing process is performed to calculate the statistical data or the like (S509). The process is then completed.

Figure 6:
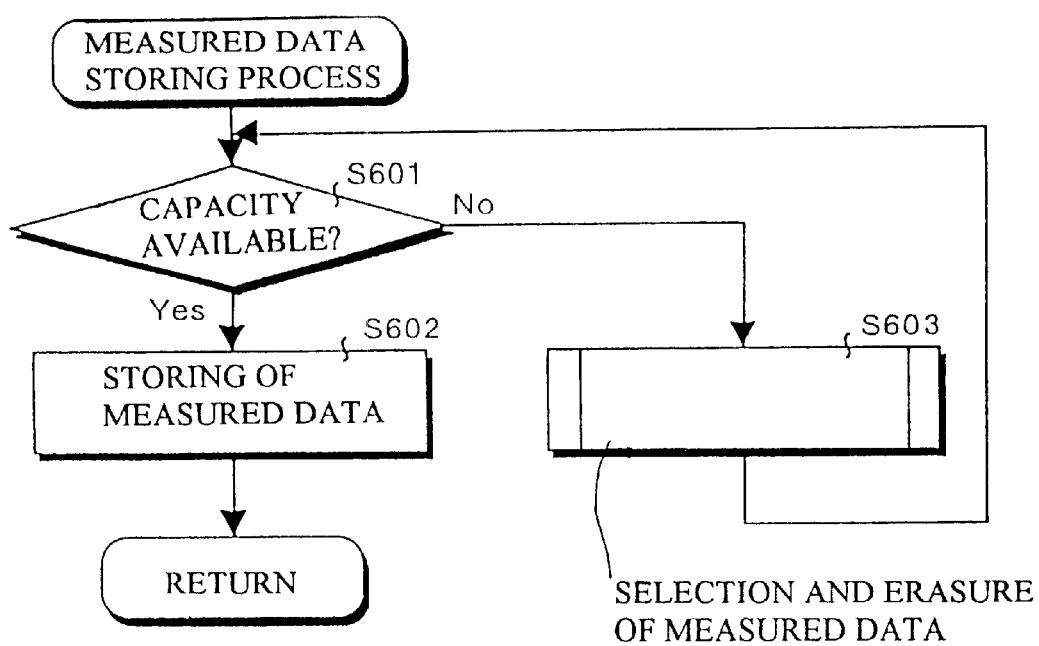
FIG. 6 is a flowchart for the storing process of measured data to be performed by the control section in accordance with the first embodiment of the present invention.

FIG. 6 is a flowchart for the measurement data storing process to be performed by the control section 105 in the present embodiment. In the measured data storing process, the control section 105 first determines whether or not there is sufficient vacant capacity available in the storing region for measured data in the storing section 103 (S601). When sufficient vacant capacity is not available in the storing region for measured data, the control section 105 prompts, via the display section 104, a user to select data to be erased, and erase the data selected via the input section 101 (S603). A control is then returned to the step S601. On the other hand, sufficient vacant capacity is available in the storing region for measured data, the measured data, including the contents of the SPLIT(1) register through the SPLIT(N) register and the date data indicating the date when the measurement was conducted, should be stored as they are (S602), and the process is then completed.

Figure 7:
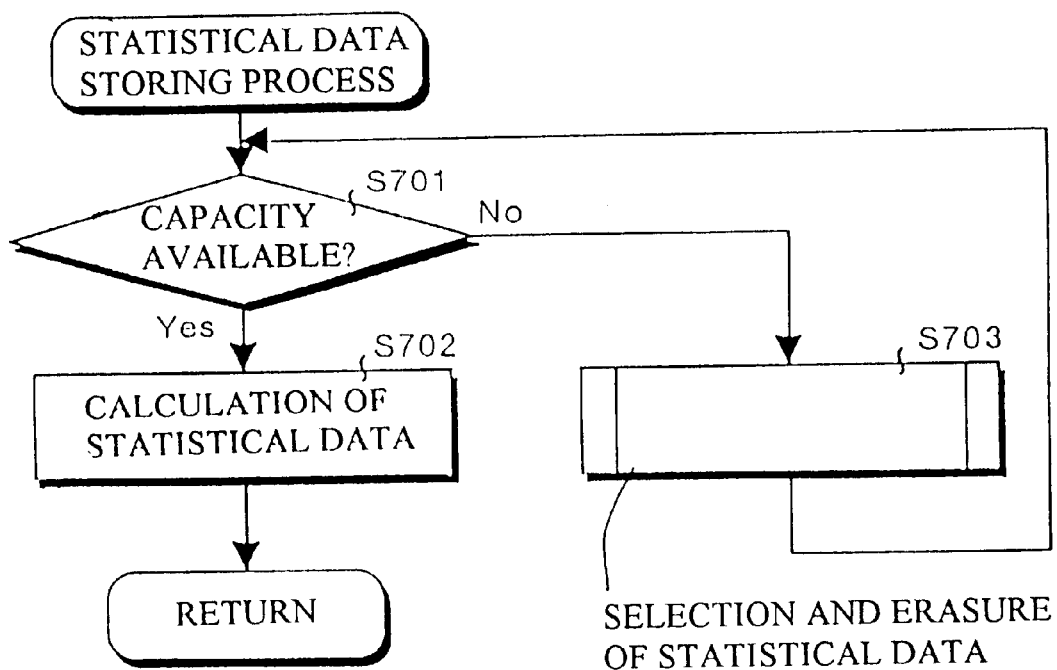
FIG. 7 is a flowchart for the storing process of statistical data to be performed by the control section in accordance with the first embodiment of the present invention.

FIG. 7 is a flowchart for the statistical data storing process to be performed by the control section 105 in the present embodiment. In the statistical data storing process, the control section 105 first determines whether or not there is sufficient vacant capacity available in the storing region for statistical data in the storing section 103 (S701). In the storing region for statistical data, three kinds of the statistical data, i.e., a total time which is the sum of the measurement time, the maximum and minimum values in the lap time, have been stored for each date (in other words, a plurality of values have been stored for the respective three kinds of the statistical data). When it is determined at the step S701 that sufficient vacant capacity is not available in the storing region for the statistical data, the control section 105 prompts, via the display section 104, a user to select data to be erased, and erase the data selected via the input section 101 (S703). A control is then returned to the step S701.

On the other hand, when sufficient vacant capacity is available in the storing region for measured data, a control proceeds to the step S702. When the statistical data corresponding to the specific date when the measured data was obtained has not been stored, the measured data in the SPLIT(N) register is considered to be a total time that indicates the sum of the measurement time, and the maximum and minimum values of lap time are obtained by comparing the contents of the SPLIT(1)–(N) registers, at the step S702. The thus obtained values are stored in the storing region for statistical data as the statistical data corresponding to the specific date of measurement. The measurement process is then completed.

On the other hand, when the statistical data corresponding to the specific date when the measured data was obtained has been stored, the measured data in the SPLIT(N) register is added to the corresponding total time so that a new total time is calculated to be updated. In addition, the new maximum and minimum values of lap time are calculated and updated based on the lap time values obtained from the contents of the SPLIT(1)–(N) registers and the maximum and minimum values of the corresponding lap time. The measurement process is then completed.

Next, display of the stored measured data and statistical data will be now described with reference to FIGS. 8–11. FIG. 8 is a diagram for illustrating an example of contents of the storing region for measured data in the present embodiment, FIG. 9 is a diagram for illustrating an example of contents of the storing region for statistical data in the present embodiment, FIG. 10 is a diagram for illustrating an example of display of the measured data in the present embodiment, and FIG. 11 is a diagram for illustrating an example of display of the statistical data in accordance with the present embodiment.

In the storing region for measured data in the present embodiment, the measured data of, for example, thirty batches measured on Dec. 13, 1998 are stored, as illustrated in FIG. 8. The control section 105 inputs the measured data from the storing region for measured data of the storing section 103 in accordance with the user's button operation in the input section 101. The control section 105 then displays, on the display section 104, a set of data for this batch of measurement including the total time, the number of laps, and the date, or another set of data for each lap including the lap time, the split time, and the date, as illustrated in FIGS. 10(a), (b) and (c).

In the storing region for statistical data in the present embodiment, for example, a set of data including the date, the daily total time, and the daily maximum and minimum values of lap time for each measurement date up to Dec. 13, 1998 are stored, as illustrated in FIG. 9. The control section 105 inputs the statistical data from the storing region for statistical data of the storing section 103 in accordance with the user's operation in the input section 101. The control section 105 then displays, on the display section 104, a set of data for a certain month including the monthly total time, the number of days when the measurement was conducted on that month, and the name of the month when the measurement was conducted, or another set of data for each measurement date including the daily maximum and minimum values of the lap time, the daily total time, and the date when the measurement was conducted, as illustrated in FIGS. 11(a), (b) and (c).

As described above, in accordance with the first embodiment of the present invention, a plurality of kinds of statistical data such as the total time or the like are stored for the respective set periods of time, and it is determined, after the completion of measurements, whether or not the measured data to be outputted should be stored. Based on this determination, the storing operation of the measured data is controlled. In addition, new statistic data is calculated from the measured data and the stored statistical data to update the statistical data. It is possible on a later date to easily confirm the stored statistical data and measured data through the button operations. Thus, when temporal changes in the statistical data for the respective times or the periods of time to be calculated from the measured data of several batches is required to be confirmed, or when some of the measured data is required to be confirmed in more detail, a user is not requested to perform the repeating procedure of copying the stored measured data onto a notebook or the like and erasing the copied measured data, followed by the calculation of the statistical data. Thus, burden to be imposed on a user is reduced, and the measured data and statistical data with the high reliability can be confirmed immediately when it is required to do so.

In the first embodiment, the new statistical data are described to be calculated for each batch of measurement from the measured data that is outputted for each batch of measurement and the stored statistical data. Alternatively, the calculation may be performed as follows. The measured data for a certain date can be stored for the calculation of statistical data to be performed later. The statistical data then can be later calculated from the stored measured data for the previous one day. After the calculation, the measured data used for the calculation can be erased.

Embodiment 2

As a portable measurement apparatus in accordance with a second embodiment of the present invention, a wristwatch having functions as a stopwatch as well as a function to measure speed and distance employing GPS (Global Positioning System) is taken as an example. The wristwatch of the present embodiment has the structure similar to that of the aforementioned wristwatch in the first embodiment, and is further provided with a GPS antenna and a GPS receiver in the measurement section. Although the operations of the wristwatch in the present embodiment is basically similar to those in the first embodiment, the measured data and the statistical data have different structures and are displayed in different manners.

The GPS receiver and the GPS antenna are the conventional art well known to those skilled in the art, and therefore, the description thereof will be omitted here. Accordingly, only the structures of the measured data and the statistical data, as well as the displaying scheme for the stored measured and statistical data, will be described with reference to FIGS. 12–18.

In the storing region for measured data in the present embodiment, the measured data of, for example, thirty batches measured on Dec. 13, 1998 are stored, as illustrated in FIG. 12. The measured data includes the split time, the distance covered from the start, the speed, and the date.

Figure 14:
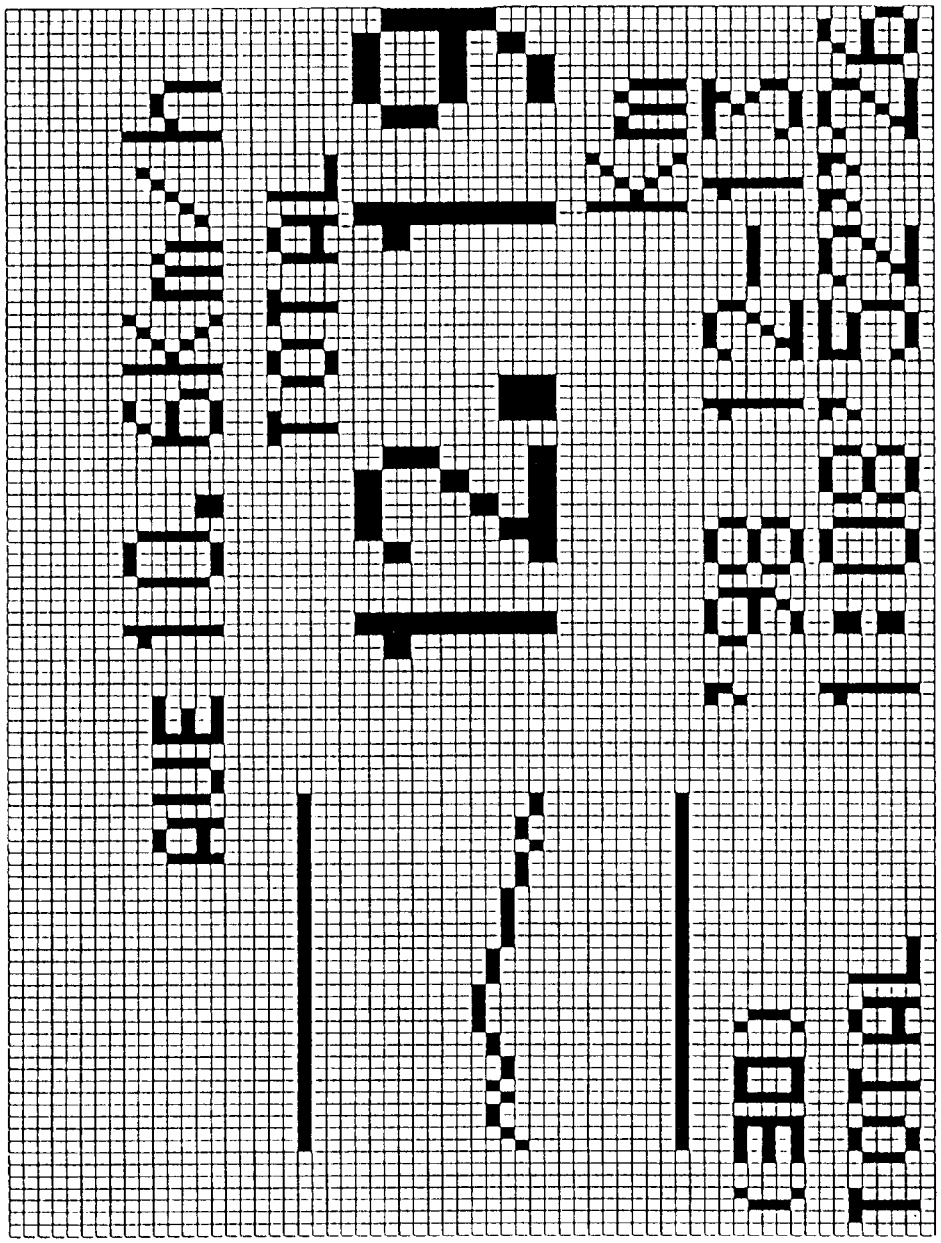
FIG. 14 is a diagram for illustrating an exemplary display of the measured data in accordance with the second embodiment of the present invention.
Figure 15:
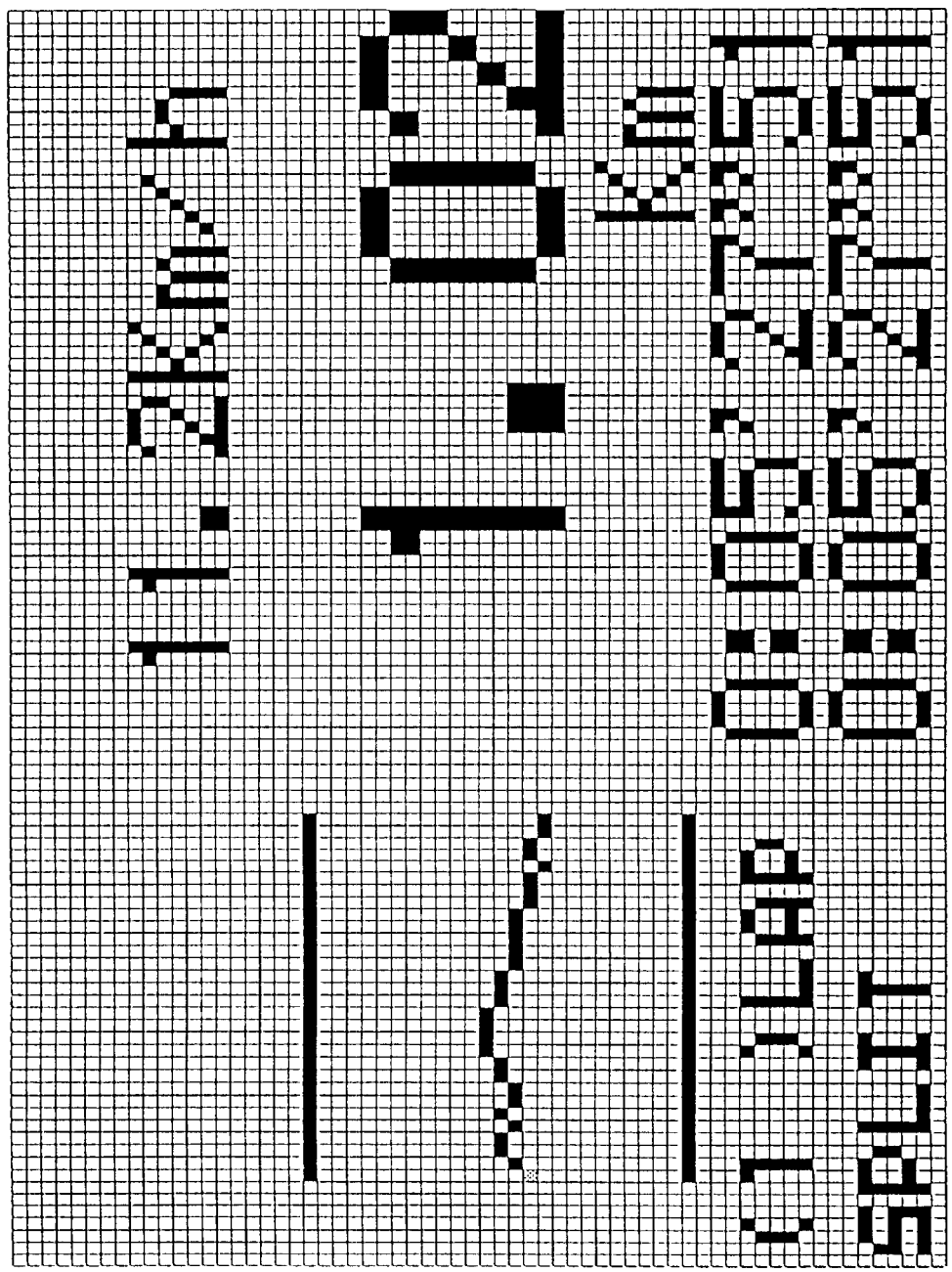
FIG. 15 is a diagram for illustrating another exemplary display of the measured data in accordance with the second embodiment of the present invention.
Figure 16:
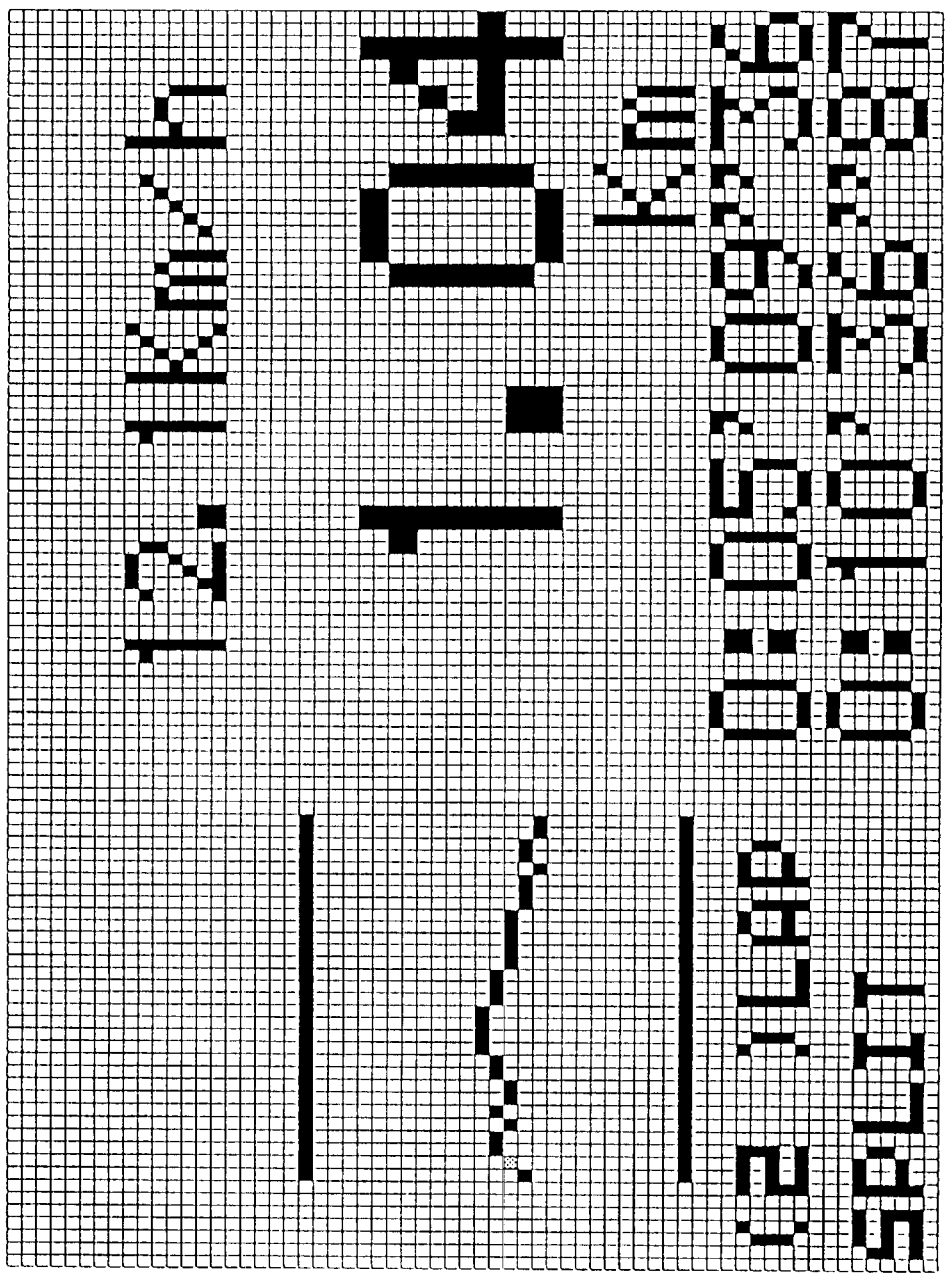
FIG. 16 is a diagram for illustrating still another exemplary display of the measured data in accordance with the second embodiment of the present invention.

The control section 105 inputs the measured data from the storing region for measured data of the storing section 103 in accordance with the user's button operation in the input section 101. The control section 105 then displays, on the display section 104, a set of data for this batch of measurement including the average speed, the total covered distance as the sum of the measured distance, the number of laps, the date, and the total time, as illustrated in FIG. 14, or another set of data for each lap including the speed, the covered distance, the lap time, and the split time, as illustrated in FIGS. 15 or 16.

Figure 17:
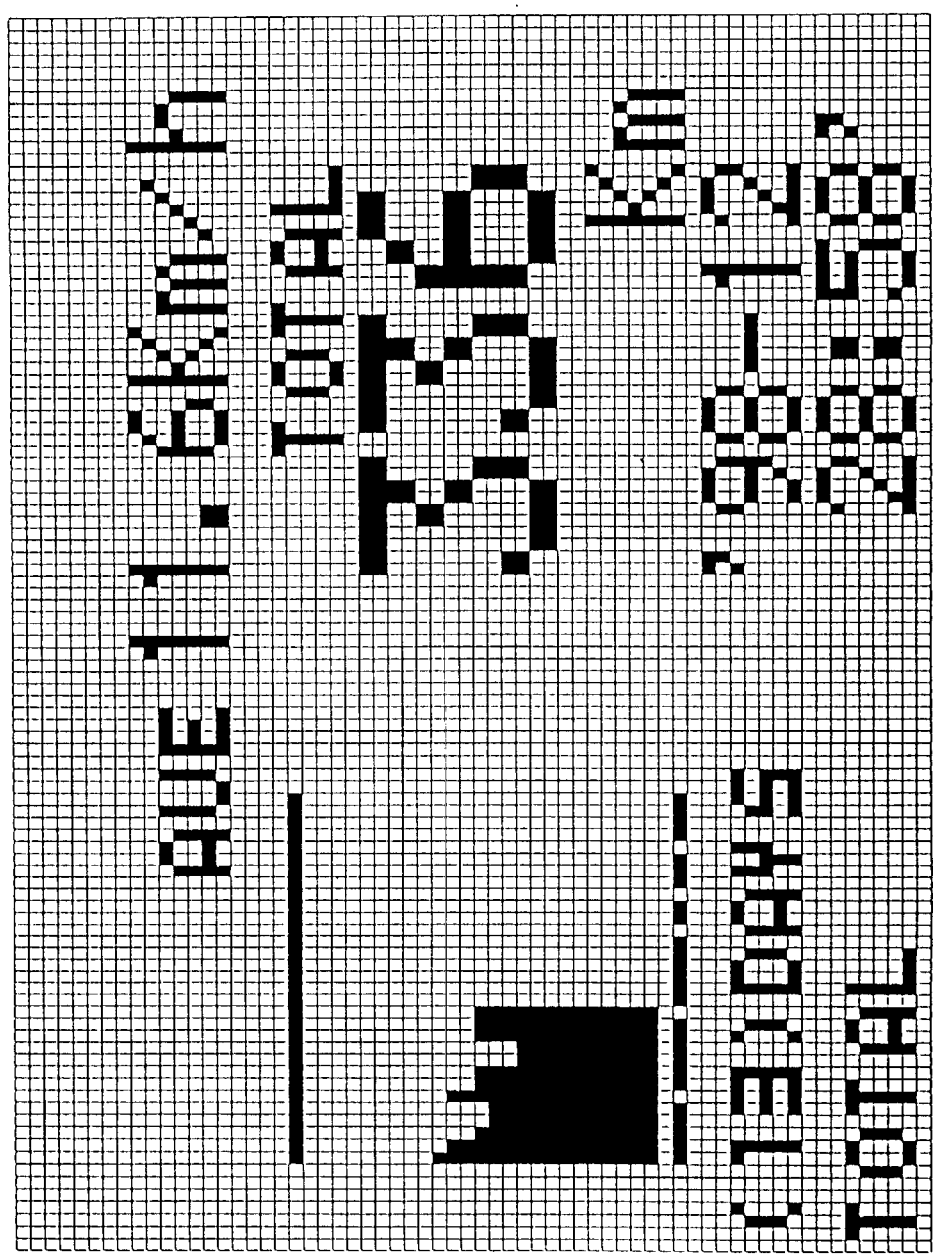
FIG. 17 is a diagram for illustrating an exemplary display of the statistical data in accordance with the second embodiment of the present invention.
Figure 18:
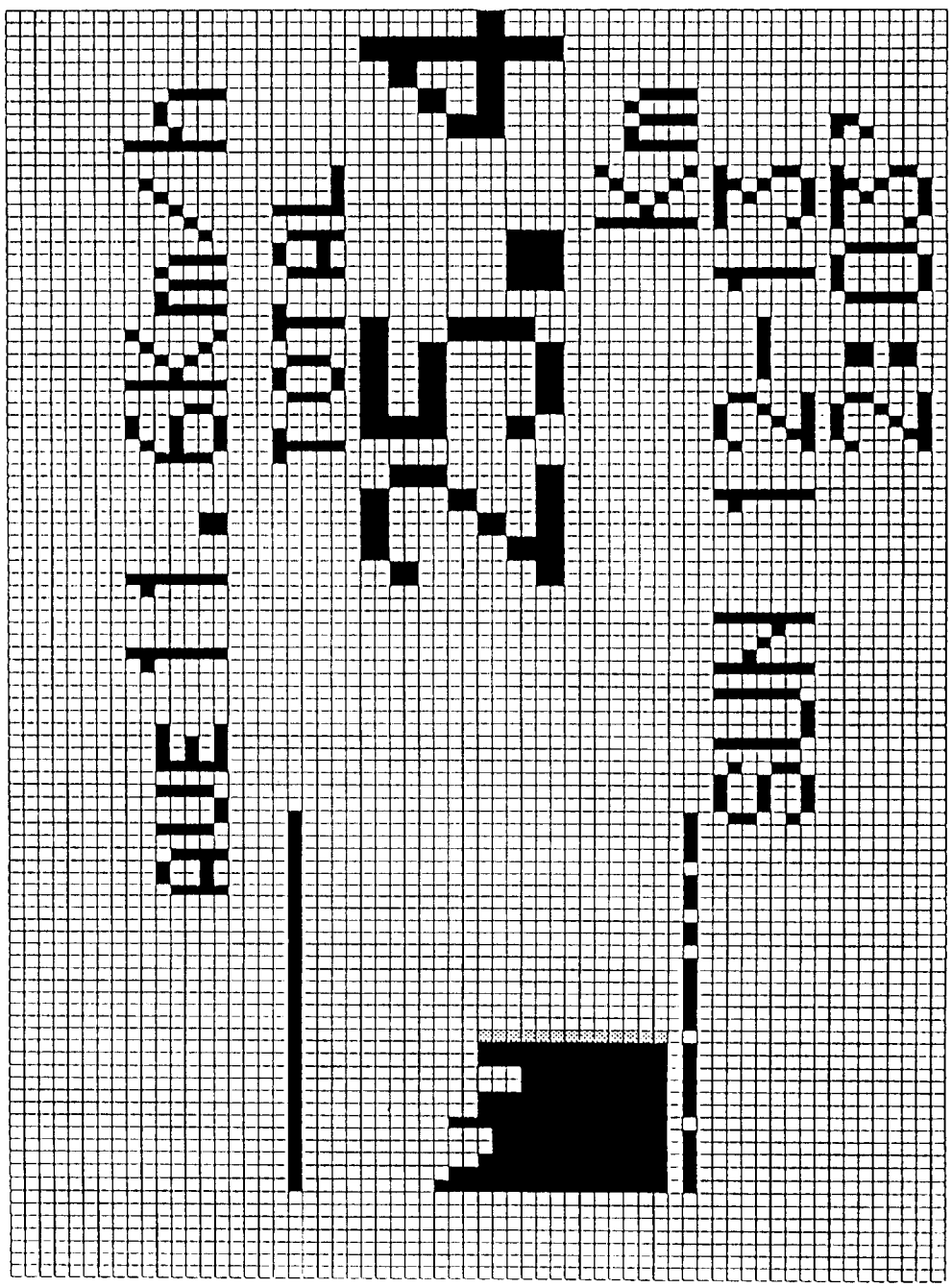
FIG. 18 is a diagram for illustrating another exemplary display of the statistical data in accordance with the second embodiment of the present invention.

In the storing region for statistical data in the present embodiment, for example, the date, the total time, and the total covered distance for each date when the measurement was conducted up to Dec. 13, 1998 are stored, as illustrated in FIG. 13. The control section 105 inputs the statistical data from the storing region for statistical data of the storing section 103 in accordance with the user's button operation in the input section 101. The control section 105 then displays, on the display section 104, a set of data for a certain month including the monthly average speed, the monthly total covered distance, the name of the month when the measurement was conducted, and the monthly total time, as illustrated in FIG. 17, or another set of data for each measurement date including the daily average speed, the daily total distance, the date when the measurement was conducted, and the daily total time, as illustrated in FIG. 18.

As described above, in accordance with the present embodiment, the measured data and the statistical data with respect to the speed, the covered distance, and the time can be stored, while the advantages similar to the previous embodiment can be also obtained.

The wristwatch having the various stopwatch functions and the wristwatch having the speed and distance measurement functions employing GPS have been described in the above as examples of a portable measurement apparatus in the first and second embodiments of the present invention. However, the portable measurement apparatus of the present invention is not limited to these examples. Alternatively, the portable measurement apparatus of the present invention may be a wristwatch having functions to measure a time, a period of time, a pulse rate, a blood pressure, an atmospheric pressure, a temperature, an intensity of magnetic field, a speed, a distance or the like, or any portable measurement apparatus, other than a wristwatch, having a function to measure these parameters. As described above, a portable measurement apparatus in accordance with the present invention measures at least one of a time, a period of time, a pulse rate, a blood pressure, an atmospheric pressure, a temperature, an intensity of magnetic field, a speed, a distance, and calculates new statistical data by employing the measured data and the stored statistical data to update the statistical data by employing the calculated new statistical data. In addition, it is set whether the measured data should be stored or not, and the measured data is stored only when it is determined that the measured data should be stored. Accordingly, the present invention can reduce burden imposed on a user and allows a user to immediately confirm the measured and statistical data with the high reliability immediately when required to do so.

Furthermore, in the portable measurement apparatus in accordance with the present invention, the statistical data includes a plurality of statistical values for the respective predetermined times or the respective predetermined periods of time, and based on the time or the period of time when the measured data has been obtained, the corresponding statistical data is updated. Accordingly, it is possible to see temporal changes in the statistical data over the predetermined times or the predetermined periods of time.

Furthermore, in the portable measurement apparatus of the present invention, a time or a period of time for obtaining the statistical data can be arbitrarily set. Accordingly, it is possible to see temporal changes in the statistical data over any arbitrary times or any arbitrary periods of time.

Furthermore, in the portable measurement apparatus of the present invention, a plurality of calculation schemes can be allowed to be set for calculating the statistical data, and a plurality of kinds of the statistical data are calculated employing the thus-set plurality of calculation schemes to update the plurality of the statistical data in the statistical data storing means. Accordingly, a plurality of statistical data can be confirmed.

What is claimed is:

1. A portable measurement apparatus, comprising:
   measurement means for measuring a performance-related variable and outputting measured data based on the measurement result;
   measured data storing means for storing the measured data;
   statistical data storing means for storing statistical data comprising a statistical value obtained by performing at least one statistical process on the measured data;
   setting means for allowing a user to determine whether the measured data is to be stored and, if so, whether the data is to be stored in the measured data storing means so that measured data can be stored for statistical analysis at any desired time or in the statistical data storing means so that the at least one statistical process is performed at predefined times;
   a control section for performing the at least one statistical process;
   data storing control means for controlling data storing operations so that the measured data is stored in the statistical data storing means to undergo the at least one statistical process and is stored in the measured data storing means only when the user has set the setting means to store the measured data; and
   update means for calculating new statistical data by employing newly obtained measured data and statistical data stored in the statistical data storing means when measured data is output by the measurement means, and updating the statistical data in the statistical data storing means by employing the calculated new statistical data.

2. A portable measurement apparatus according to claim 1; wherein the statistical data includes a plurality of statistical values calculated at predetermined times, and the update means updates the corresponding statistical data at the predetermined times.

3. A portable measurement apparatus according to claim 2; further comprising time period setting means for setting one of a time and a time interval for calculation of the statistical data.

4. A portable measurement apparatus according to claim 1; wherein the setting means includes means for providing a plurality of user-selectable calculation schemes to calculate the statistical data, and the update means calculates the statistical data by employing selected calculation schemes to update the statistical data in the statistical data storing means.

5. A portable measurement apparatus according to claim 2; wherein the setting means includes means for providing a plurality of user-selectable calculation schemes to calculate the statistical data, and the update means calculates the statistical data by employing selected calculation schemes to update the statistical data in the statistical data storing means.

6. A portable measurement apparatus according to claim 3; wherein the setting means includes means for providing a plurality of user-selectable calculation schemes to calculate the statistical data, and the update means calculates the statistical data by employing selected calculation schemes to update the statistical data in the statistical data storing means.

7. A portable measurement apparatus according to claim 1; wherein the setting means comprises a switch.

8. A portable measurement apparatus according to claim 1; further comprising a display device controlled by the control section to provide a display of newly obtained measured data, stored measured data and statistical data and to prompt the user to decide by operation of the setting means whether the measured data is to be stored in addition to being used by the update means to calculate the new statistical data.

9. A portable measurement apparatus according to claim 8; wherein the control section controls the display device to provide a list of individually-selectable statistical processes that may be performed on the measured data to calculate the statistical data.

10. A portable measurement apparatus according to claim 8; wherein the control section determines whether adequate storage space exists in the measured data storage means and the statistical data storage means for storing the measured data and the statistical data, and controls the display device to provide an indication of memory space availability.

11. A portable measurement apparatus according to claim 10; wherein the control section controls the display device to provide an indication of memory contents that may be erased to accommodate newly obtained measured data and new statistical data.

12. A portable measurement apparatus according to claim 8; wherein the control section performs statistical operations on a measured data obtained over an ongoing period of time.

13. A portable measurement apparatus according to claim 1; wherein the control section provides a selection of individually-selectable statistical processes that may be performed on the measured data.

14. A portable measurement apparatus according to claim 1; wherein the statistical data includes a plurality of statistical values calculated at predetermined times.

15. A portable measurement apparatus according to claim 1; wherein the measurement means comprises a GPS system for measuring at least one of a speed and a distance and outputting the measurement result as the measured data.

16. A portable measurement apparatus, comprising: a measuring device for measuring a performance-related variable and outputting the measured variable as performance data; a control section for performing one or more statistical operations on sequentially obtained performance data and producing statistical data; a memory for storing the performance data and the statistical data; an input device for allowing a user to control whether obtained performance data is to be used to update the statistical data and, if so, whether the obtained performance data is to be stored in the memory as well as being used to update the statistical data, controlling the control section to store the performance data in the memory when the user has indicated that the performance data is to be stored, and controlling the control section to calculate updated statistical data using the obtained performance data when the user has indicated that the performance data is to be used to update the statistical data.

17. A portable measurement apparatus according to claim 16; wherein the performance-related variable comprises a time.

18. A portable measurement apparatus according to claim 16; further comprising a display device controlled by the control section to provide a display of newly obtained performance data, stored performance data and statistical data, and to prompt the user to decide by operation of a switch whether the performance data is to be stored in addition to being used to update the statistical data.

19. A portable measurement apparatus according to claim 18; wherein the control section controls the display device to provide a list of individually-selectable statistical processes that may be performed on the performance data to calculate the statistical data.

20. A portable measurement apparatus according to claim 18; wherein the control section determines whether adequate storage space exists in the memory for storing the obtained performance data and updated statistical data, and controls the display device to provide an indication of memory space availability.

21. A portable measurement apparatus according to claim 18; wherein the control section controls the display device to provide an indication of memory contents that may be erased to accommodate the obtained performance data and updated statistical data.

22. A portable measurement apparatus according to claim 18; wherein the control section performs statistical operations on the performance data over an ongoing period of time.

23. A portable measurement apparatus according to claim 16; wherein the control section provides a selection of individually-selectable statistical processes that may be performed on the performance data.

24. A portable measurement apparatus according to claim 16; wherein the statistical data includes a plurality of statistical values calculated at predetermined times.

25. A portable measurement apparatus according to claim 16; wherein the measuring device comprises a GPS system for measuring at least one of a speed and a distance and outputting the measurement result as the measured data.

26. A portable measurement apparatus, comprising: measurement means for measuring at least one of a speed and a distance using a GPS system and outputting measured data based on the measurement result; measured data storing means for storing the measured data; statistical data storing means for storing statistical data comprising one or more statistical values obtained by performing at least one statistical process on the measured data; setting means for setting a determination regarding whether or not the measured data output by the measurement means is to be stored and, if so, whether the measured data is to be stored in the measured data storing means or the statistical data storing means; data storing control means for controlling data storing operations so that at least one statistical process is performed on the measured data and the measured data is stored in the measured data storing means so that statistical analysis may be performed thereon at any desired time only when it has been determined by the setting means to store the measured data in the measured data storing means, and so that the measured data is stored only in the statistical data storing mean when it has been determined by the setting means to store the measured data in the statistical data storing means; and update means for calculating new statistical data by employing the measured data and the statistical data stored in the statistical data storing means and updating the statistical data in the statistical data storing means by employing the calculated new statistical data.

27. A portable measurement apparatus, comprising: measurement means for measuring at least one of a pulse rate or a blood pressure, and outputting measured data based on the measurement result; measured data storing means for storing the measured data output; statistical data storing means for storing statistical data comprising a statistical value obtained by performing at least one statistical process on the measured data; setting means for allowing a user to determine whether the measured data is to be stored in the measured data storing means so that measured data can be stored for statistical analysis at any desired time; a control section for performing the at least one statistical process; data storing control means for controlling data storing operations so that the measured data is stored in the measured data storing means only when the user has set the setting means to store the measured data; and update means for calculating new statistical data by employing newly obtained measured data and statistical data stored in the statistical data storing means when measured data is output by the measurement means, and updating the statistical data in the statistical data storing means by employing the calculated new statistical data.

28. A portable measurement apparatus, comprising: measurement means for measuring a performance-related variable and outputting measured data based on the measurement result; measured data storing means for storing the measured data; statistical data storing means for storing statistical data comprising a plurality of statistical values obtained by performing statistical processes on the measured data at predetermined times; setting means for allowing a user to determine whether the measured data is to be stored in the measured data storing means so that measured data can be stored for statistical analysis at any desired time; a control section for performing the statistical processes at the predetermined times; data storing control means for controlling data storing operations so that the measured data is stored in the measured data storing means only when the user has set the setting means to store the measured data; and update means for calculating new statistical data by employing newly obtained measured data and statistical data stored in the statistical data storing means when measured data is output by the measurement means, and updating the statistical data in the statistical data storing means at the predetermined times by employing the calculated new statistical data.

29. A portable measurement apparatus according to claim 28; further comprising time period setting means for setting the predetermined times for calculation of the statistical data.

30. A portable measurement apparatus according to claim 28; wherein the setting means includes means for controlling the control section to provide a plurality of user-selectable calculation schemes to calculate the statistical data, and the update means calculates the statistical data by employing selected calculation schemes to update the statistical data in the statistical data storing means.

* * * * *